US012769084B2

(12) United States Patent
Kwon et al.

(10) Patent No.: US 12,769,084 B2
(45) Date of Patent: Oct. 20, 2026

(54) CAMERA MODULE WITH A LENS DRIVING APPARATUS

(71) Applicant: SAMSUNG ELECTRO-MECHANICS CO., LTD., Suwon-si (KR)

(72) Inventors: Ohbyoung Kwon, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 523 days.

(21) Appl. No.: 18/354,169

(22) Filed: Jul. 18, 2023

(65) Prior Publication Data

US 2024/0053575 A1 Feb. 15, 2024

(30) Foreign Application Priority Data

Aug. 9, 2022 (KR) ........................ 10-2022-0099526
Mar. 30, 2023 (KR) ........................ 10-2023-0042091

(51) Int. Cl.
*G02B 7/08* (2021.01)
*G02B 27/64* (2006.01)
*G03B 5/04* (2021.01)
*G03B 13/36* (2021.01)

(52) U.S. Cl.
CPC ............. *G02B 7/08* (2013.01); *G02B 27/646* (2013.01); *G03B 5/04* (2013.01); *G03B 13/36* (2013.01); *G03B 2205/0015* (2013.01); *G03B 2205/0069* (2013.01)

(58) Field of Classification Search
CPC .................................................... G02B 27/646
See application file for complete search history.

(56) References Cited

U.S. PATENT DOCUMENTS

2007/0172220 A1* 7/2007 Masuda ................... G03B 5/00 396/55
2010/0033820 A1* 2/2010 Omi ......................... G03B 5/00 359/554
2013/0027790 A1* 1/2013 Park ......................... G03B 5/00 324/207.25

(Continued)

FOREIGN PATENT DOCUMENTS

DE 19855693 A1 * 6/1999 ............. G02B 23/02
JP 2007233214 A * 9/2007 ........... G02B 27/646

(Continued)

OTHER PUBLICATIONS

Machine translation of DE 19855693 retrieved electronically from PE2E Search Feb. 5, 2026 (Year: 1999).*

(Continued)

*Primary Examiner* — Cara E Rakowski
(74) *Attorney, Agent, or Firm* — NSIP Law

(57) ABSTRACT

A lens driving apparatus includes a lens holder configured to accommodate a lens; a carrier configured to accommodate the lens holder; a first optical image stabilization (OIS) driver, disposed outside of the lens holder, configured to drive the lens holder in a first direction perpendicular to an optical axis; and a second OIS driver, disposed outside of the carrier to oppose the first OIS driver and having the lens holder interposed therebetween, configured to drive the carrier in a second direction perpendicular to the optical axis and the first direction.

13 Claims, 9 Drawing Sheets

(56) References Cited

U.S. PATENT DOCUMENTS

| | | | | |
|---|---|---|---|---|
| 2016/0178924 | A1 | 6/2016 | Lim et al. | |
| 2016/0252746 | A1* | 9/2016 | Kim | H04N 23/57 359/557 |
| 2017/0108705 | A1 | 4/2017 | Yu et al. | |
| 2021/0173223 | A1 | 6/2021 | Seo et al. | |
| 2022/0082848 | A1* | 3/2022 | Han | H04N 23/55 |
| 2024/0134249 | A1* | 4/2024 | Kim | H04N 23/687 |

FOREIGN PATENT DOCUMENTS

| | | | | |
|---|---|---|---|---|
| KR | 20120046878 | A * | 5/2012 | G02B 27/646 |
| KR | 10-2015-0051775 | A | 5/2015 | |
| KR | 10-2016-0139589 | A | 12/2016 | |
| KR | 10-1751105 | B1 | 6/2017 | |
| KR | 10-2021-0076347 | A | 6/2021 | |
| KR | 10-2272591 | B1 | 7/2021 | |
| KR | 10-2297487 | B1 | 9/2021 | |
| KR | 10-2412258 | B1 | 6/2022 | |

OTHER PUBLICATIONS

Machine translation of JP 2007233214 retrieved electronically from PE2E Search Feb. 5, 2026 (Year: 2007).*
Machine translation of KR 20120046878 retrieved electronically from PE2E Search Feb. 5, 2026 (Year: 2012).*
Korean Office Action Issued on May 23, 2025, in Counterpart Korean Patent Application No. 10-2023-0042091 (8 Pages in English, 7 Pages in Korean).
Korean Office Action Issued on Jan. 20, 2026, in Counterpart Korean Patent Application No. 10-2023-0042091 (1 Page in English, 2 Pages in Korean).

* cited by examiner

CAMERA MODULE WITH A LENS DRIVING APPARATUS

CROSS-REFERENCE TO RELATED APPLICATIONS

This application claims the benefit under 35 USC § 119(a) of Korean Patent Application No. 10-2023-0042091, filed on Mar. 30, 2023, and Korean Patent Application No. 10-2022-0099526 filed on Aug. 9, 2022, in the Korean Intellectual Property Office, the entire disclosure of which are incorporated herein by reference for all purposes.

BACKGROUND

1. Field

The present disclosure relates to a camera module with a lens driving apparatus.

2. Description of the Related Art

The supply and use of electronic devices in information and communication technology tend to provide various functions that converge with each other without remaining in their traditional unique domains.

Cameras in electronic devices, such as a smartphone, a tablet personal computer (PC), or a laptop computer, may include an autofocus (AF) function, an optical image stabilization (OIS) function, and/or a zoom function.

The autofocus function may acquire a clear image of a subject from an imaging plane of an image sensor by moving a lens disposed in front of the image sensor in an optical axis direction based on its distance to the subject.

The optical image stabilization function may include camera shake correction, hand trembling correction, and the like, and may stabilize a captured image of the subject due to unintentional camera shake or hand tremble by a photographer when the camera is moved or not fixed.

Camera functions in portable electronic devices are becoming more complex and sophisticated, which may increase the size and weight of its sensor unit and lens driver; however, increased weight of the lens driver, for example, may cause deformation of the device and/or lower the performance of the camera.

Therefore, there is an increasing demand for a camera module that may cope with a high-frequency disturbance by reducing camera shake during video recording while including the lens driver having less weight.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a lens driving apparatus includes a lens holder configured to accommodate a lens; a carrier configured to accommodate the lens holder; a first optical image stabilization (OIS) driver, disposed outside of the lens holder, configured to drive the lens holder in a first direction perpendicular to an optical axis; and a second OIS driver, disposed outside of the carrier to oppose the first OIS driver and having the lens holder interposed therebetween, configured to drive the carrier in a second direction perpendicular to the optical axis and the first direction.

The apparatus may further include an autofocus (AF) driver, disposed outside of the lens holder, configured to drive the lens holder in an optical axis direction.

The AF driver and the first OIS driver may be disposed on a same outer surface of the lens holder.

The AF driver may include an AF driving magnet disposed on one outer surface of outer surfaces of the lens holder to face an AF driving coil with a gap therebetween. The first OIS driver may include a first OIS driving magnet disposed on one outer surface of the outer surfaces of the lens holder to face a first OIS driving coil with a gap therebetween. The second OIS driver may include a second OIS driving magnet disposed on one outer surface of the outer surfaces of the carrier to face a second OIS driving coil with a gap therebetween.

The AF driving magnet and the first OIS driving magnet may be disposed on a same outer surface of the lens holder.

The first OIS driving magnet may include a pair of magnets, disposed on opposing sides of the one outer surface of the lens holder and having the AF driving magnet interposed therebetween.

The first OIS driving magnet may include regions divided in the first direction with different magnetic poles.

The apparatus may further include an elastic member, connecting the lens holder and the carrier with each other, configured to provide the lens holder with a restoring force in an optical axis direction or the first direction.

The elastic member may include an elastic wire extending in the second direction to connect the lens holder with the carrier.

The apparatus may further include a base on which the carrier is seated. A rolling member may be interposed between the carrier and the base.

The apparatus may further include a holding magnet and a holding yoke disposed on the carrier and the base, respectively, to generate an attractive force between the carrier and the base.

In another one or more general aspects, a lens driving apparatus includes a lens holder configured to accommodate a lens; a carrier configured to accommodate the lens holder; a lens driver configured to drive the lens holder in an optical axis direction or in a first direction perpendicular to an optical axis, or drive the carrier in a second direction perpendicular to the optical axis direction and the first direction; and an elastic member configured to connect the lens holder to the carrier, and provide the lens holder with a restoring force in the optical axis direction or the first direction.

The lens driver may include a first driving unit configured to drive the lens holder in the optical axis direction and the first direction, and a second driving unit configured to drive the carrier in the second direction.

The first driving unit and the second driving unit may be disposed to oppose each other and have the lens holder interposed therebetween.

The elastic member may include an elastic wire extending in the second direction to connect the lens holder with the carrier.

One end of the elastic wire may be connected to an external portion of the lens holder and another end of the elastic wire may be connected to an internal portion of the carrier.

The apparatus may further include a base on which the carrier is seated. A rolling member may be interposed between the carrier and the base.

A holding magnet and a holding yoke may be disposed on the carrier and the base, respectively, to generate an attractive force between the carrier and the base.

In another one or more general aspect, a lens driving apparatus includes a lens holder configured to accommodate a lens; a carrier configured to accommodate the lens holder; a first driving unit configured to drive the lens holder in an optical axis direction and a first direction perpendicular to an optical axis; and a second driving unit configured to drive the carrier in a second direction perpendicular to the optical axis and the first direction.

The lens holder may be configured to move relative to the carrier in the optical axis direction.

The apparatus may further include a base configured to accommodate the lens holder and the carrier. The carrier may be configured to move relative to the base in the second direction.

The carrier may be configured to move relative to the lens holder in the second direction.

The first driving unit and the second driving unit may be disposed to oppose each other and have the lens holder interposed therebetween.

In another general aspect, an apparatus includes a lens holder configured to move in an optical axis direction or in a first direction perpendicular to an optical axis; a carrier configured to accommodate the lens holder and move in a second direction perpendicular to the optical axis direction and the first direction; an elastic member configured to connect the lens holder to the carrier, and provide the lens holder with a restoring force in the optical axis direction or the first direction; and a rolling member interposed between the carrier and a base configured to seat the carrier.

The lens holder may include a lens holder yoke and the carrier may include a carrier yoke. The elastic member may connect the lens holder yoke to the carrier yoke.

The elastic member may include elastic wires connecting opposing ends of the lens holder yoke to opposing ends of the carrier yoke.

The rolling member may include a plurality of balls accommodated in a plurality of guide grooves disposed at edge regions of the base. Each of the plurality of guide grooves may extend in the second direction to guide the carrier in the second direction.

The apparatus may further include a first optical image stabilization (OIS) driver, disposed outside of the lens holder, configured to drive the lens holder; a second OIS driver configured to drive the carrier in a second direction perpendicular to the optical axis and the first direction, wherein the second OIS driver is disposed outside of the carrier to oppose the first OIS driver and having the lens holder interposed therebetween; and an autofocus (AF) driver, disposed outside of the lens holder, configured to drive the lens holder in an optical axis direction.

The AF driver may include an AF driving magnet disposed on a first outer surface of the lens holder to face an AF driving coil with a gap therebetween. The first OIS driver may include a first OIS driving magnet disposed on the first outer surface of the lens holder to face a first OIS driving coil with a gap therebetween. The second OIS driver may include a second OIS driving magnet disposed on a second outer surface of the carrier to face a second OIS driving coil with a gap therebetween.

The first OIS driving magnet may include a pair of magnets, disposed on opposing sides of the first outer surface of the lens holder and having the AF driving magnet interposed therebetween.

The first OIS driving magnet may include regions divided in the first direction with different magnetic poles.

Other features and aspects will be apparent from the following detailed description, the drawings, and the claims.

Figure 1:
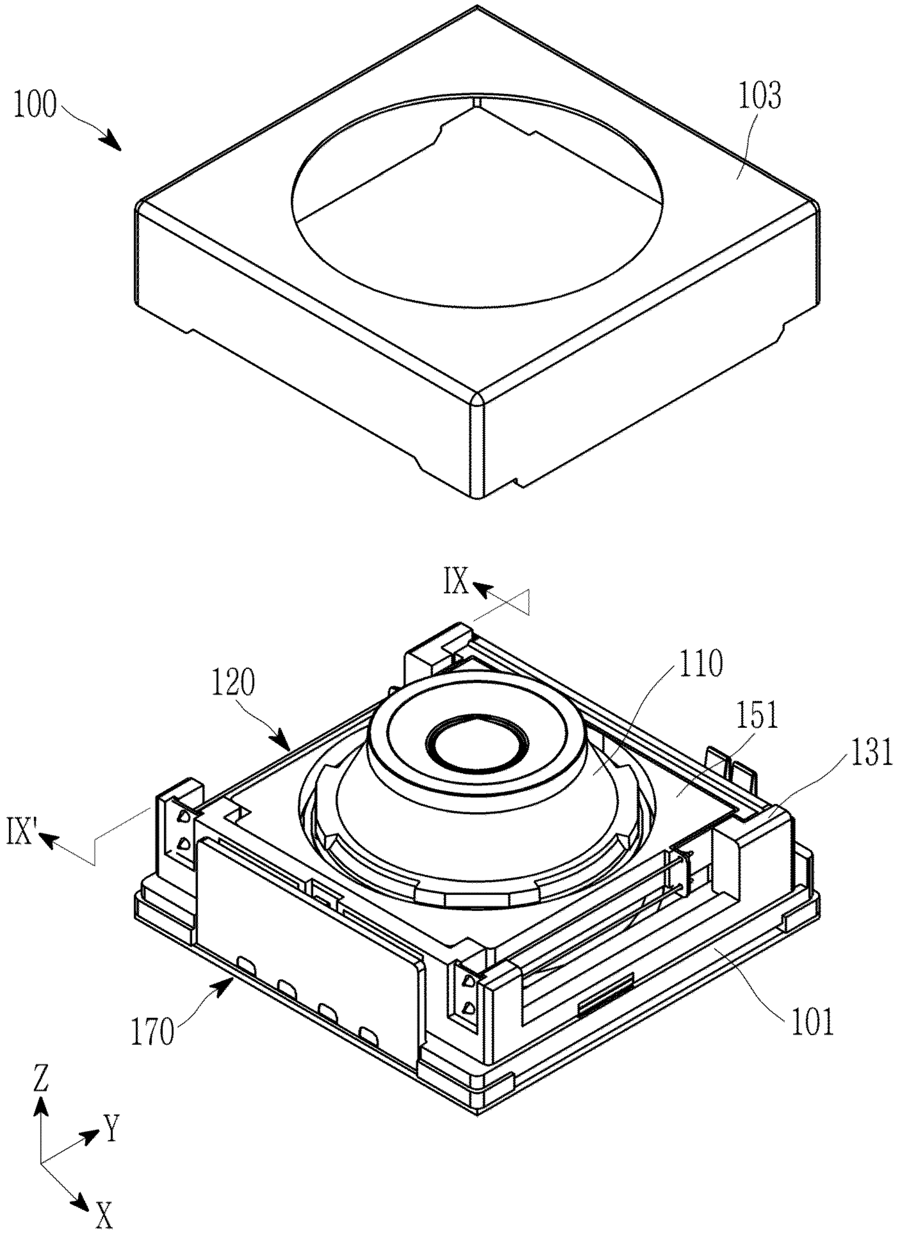
FIG. 1 is an exploded perspective view showing an example of a camera module with an open cover, according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Further, throughout the specification, an expression "on the plane" may indicate a case where a target is viewed from the top, and an expression "on the cross section" may indicate a case where a cross section of a target taken along a vertical direction is viewed from its side.

The present disclosure discloses a lens driving apparatus that may prevent the deformation of components by reducing a weight of a lens driver, and coping with a high-frequency disturbance by mitigating camera shake during an image capture, and a camera module including the same.

Figure 2:
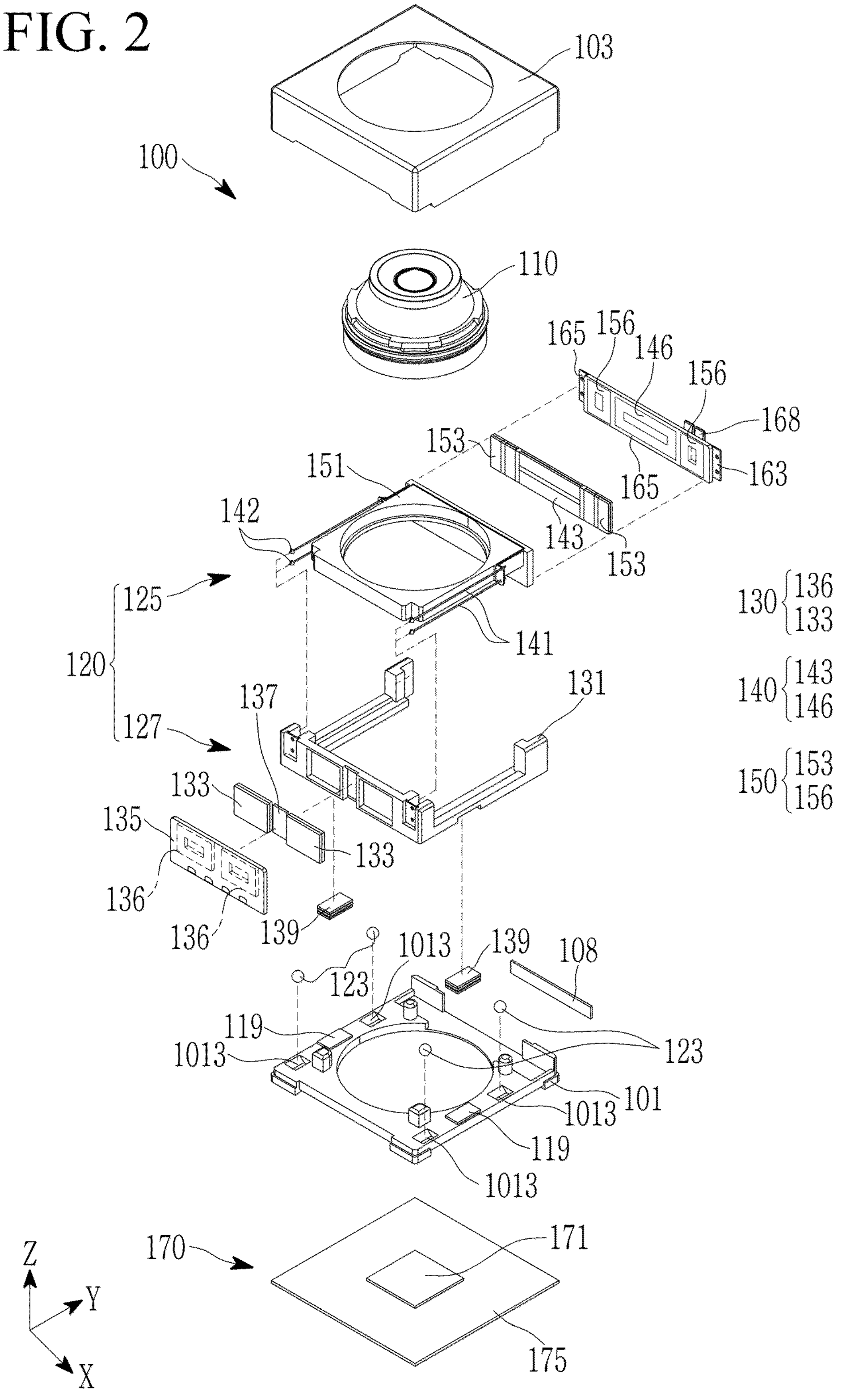
FIG. 2 is an exploded perspective view showing a disassembled configuration of the camera module shown in FIG. 1.

FIG. 1 is an exploded perspective view showing an example of a camera module with an open cover, according to an embodiment. FIG. 2 is an exploded perspective view showing a disassembled configuration of the camera module shown in FIG. 1.

Referring to FIGS. 1 and 2, a camera module 100, according to this embodiment, may include a lens barrel 110, a lens driving apparatus 120 configured to move the lens barrel 110, an image sensor unit 170 configured to convert light incident through the lens barrel 110 into an electrical signal, a base 101 configured to accommodate the lens barrel 110 and the lens driving apparatus 120, and a cover 103 configured to cover the base 101.

The lens barrel 110 may have a hollow cylindrical shape for a plurality of lenses capturing an image of a subject to be accommodated therein, and the plurality of lenses may be mounted in the lens barrel 110 along an optical axis. The number of lenses disposed in the lens barrel 110 may depend on the design and desire of the lens barrel 110, and each of the lenses may have different optical characteristics, e.g., the same or different refractive indices.

The optical axis may be set to a central axis of the lens accommodated in the lens barrel 110, and an optical axis direction refers to a direction parallel to this central axis. In the drawings, the optical axis is set as the z-axis, and the x-axis and the y-axis are set in directions perpendicular to the optical axis. Here, the x-axis and the y-axis are perpendicular to each other, and an x-y plane formed by the x-axis and the y-axis becomes a plane perpendicular to the optical axis.

The lens barrel 110 may be accommodated in a lens holder 151, and the lens holder 151 may be accommodated in a carrier 131. The lens holder 151 may have a central opening into which the lens barrel 110 may be inserted, and the lens barrel 110 may be coupled and fixed to the lens holder 151 through the central opening. The lens holder 151 and the carrier 131 may be seated on the base 101 together. For example, the lens holder 151 may have a quadrilateral shape. The carrier 131 may have a shape of a Greek capital letter pi (Π) and disposed to surround the lens holder 151 on three sides. The base 101 may have a quadrilateral shape with a central opening. The central opening of the lens holder 151 and the central opening of the base 101 may be aligned with each other in the optical axis direction.

The lens driving apparatus 120 may include a first driving unit 125 coupled with the lens holder 151 and a second driving unit 127 coupled with the carrier 131. The first driving unit 125 and the second driving unit 127 may be disposed to oppose each other while having the lens holder 151 interposed therebetween. The first driving unit 125 and the second driving unit 127 may be included in a lens driver configured to drive the lens holder 151 in the optical axis direction or a first direction, or drive the carrier 131 in a second direction.

The first driving unit 125 may provide a driving force to move the lens holder 151 in the optical axis direction and the first direction (or an x-axis direction in the drawings) perpendicular thereto. The second driving unit 127 may provide a driving force to move the carrier 131 in the second direction (or a y-axis direction in the drawings) perpendicular to the optical axis and the first direction. Accordingly, the first driving unit 125 may adjust the focus of the camera module 100 by driving the lens holder 151 to move the lens barrel 110 in the optical axis direction. In addition, the first driving unit 125 may move the lens barrel 110 in the first direction by driving the lens holder 151. The second driving unit 127 may correct or reduce camera shake by driving the carrier 131 to move the lens barrel 110 in the second direction.

The lens holder 151 may relatively move in the optical axis direction or the first direction with respect to the carrier 131. The carrier 131 may relatively move in the second direction with respect to the base 101. In an example, the carrier 131 may move in the second direction together with the lens holder 151.

The first driving unit 125 may include an autofocus (AF) driver 140 and a first optical image stabilization (OIS) driver 150. The AF driver 140 may be coupled to the lens holder 151 and drive the lens holder 151 in the optical axis direction. The AF driver 140 may include an AF driving coil 146 and an AF driving magnet 143 facing the AF driving coil 146. The first OIS driver 150 may include a first OIS driving coil 156 and a first OIS driving magnet 153 facing the first OIS driving coil 156. The AF driving magnet 143 and the first OIS driving magnet 153 may each be fixed to an outer surface of the lens holder 151, and the AF driving coil 146 and the first OIS driving coil 156 may each be fixed to the base 101 via a coil board 165. In an example, the AF driving coil 146 and the first OIS driving coil 156 may each be a fine pattern (FP) coil integrally formed with the coil board 165.

A support yoke 163 may be disposed outside the coil board 165 to support the coil board 165, including the AF driving coil 146 and the first OIS driving coil 156. In an example, the support yoke 163 may be fixed to one end of the carrier 131. A flexible printed circuit board (FPCB) 168 may be connected to the coil board 165 to transmit a lens driving signal, and the FPCB 168 may extend outside of the camera module 100. A board holder 108 may be disposed outside the base 101 to support the FPCB 168, and the board holder 108 may be fixed outside or to an external surface of the base 101.

The outer surface of the lens holder 151 to which the AF driving magnet 143 and the first OIS driving magnet 153 are fixed may be disposed inward from an edge of the base 101. Accordingly, the coil board 165, including the AF driving coil 146 and the first OIS driving coil 156, may also be disposed inward from the edge of the base 101. The FPCB 168 connected to the coil board 165 may flexibly deform in response to the lens holder 151 being moved in the optical axis direction or the first direction.

The second driving unit 127 may include a second OIS driver 130. The second OIS driver 130 may oppose the first OIS driver 150 while having the lens holder 151 interposed therebetween. The second OIS driver 130 may include a second OIS driving coil 136 and a second OIS driving magnet 133 facing the second OIS driving coil 136. The second OIS driving magnet 133 may be fixed to an outer surface of the carrier 131, and the second OIS driving coil 136 may be fixed to the base 101 via the coil board 135. In an example, the second OIS driving coil 136 may be a fine pattern (FP) coil integrally formed with a board.

When power is applied to the AF driving coil 146, the lens holder 151 may be moved in the optical axis direction by the electromagnetic force between the AF driving magnet 143 and the AF driving coil 146. In an example where the lens barrel 110 is accommodated in the lens holder 151, the focus of the camera module 100 may be adjusted in response to the lens barrel 110 being moved in the optical axis direction by the movement of the lens holder 151.

The AF driving magnet 143 may be a moving member mounted on the lens holder 151 and moved in the optical axis direction together with the lens holder 151. The AF driving coil 146 may be a fixed member fixed to the base 101. In addition, the first OIS driving magnet 153 may be a moving member mounted on the lens holder 151 and moved in the first direction together with the lens holder 151. The second OIS driving magnet 133 may be a moving member mounted on the carrier 131 and moved in the second direction together with the carrier 131. The first OIS driving coil 156 and the second OIS driving coil 136 may each be a fixed member fixed to the base 101. However, the present disclosure is not limited thereto. Within the scope of the present disclosure, it is possible to swap the positions of any one or any two or more of the AF driving magnet 143 and the AF driving coil 146, the first OIS driving magnet 153 and the first OIS driving coil 156, or the second OIS driving magnet 133 and the second OIS driving coil 136.

In an example, the first OIS driver 150 may generate a driving force in the first direction perpendicular to the optical axis, and the second OIS driver 130 may generate a driving force in the second direction perpendicular to the optical axis and perpendicular to the first direction. The first OIS driver 150 and the second OIS driver 130 may be used to correct image smearing or video shake, e.g., compensate for yaw, tilt, and roll movements, due to a user's hand shaking during video or image capture. The first OIS driver 150 and the second OIS driver 130 may compensate for the camera shake by imparting relative displacement corresponding to the yaw, tilt, and roll movements of the camera to the lens barrel 110 when the camera shake occurs during the image capture, for example.

An elastic member 141 or 142, connecting the lens holder 151 and the carrier 131 with each other, may be disposed therebetween. The elastic member 141 or 142 may provide the lens holder 151 with a restoring force in the optical axis direction or a restoring force in the first direction. The elastic member 141 or 142 may be an elastic wire extending in the second direction, perpendicular to the optical axis and perpendicular to the first direction, and connecting the lens holder 151 and the carrier 131 with each other.

A rolling member 123 may be disposed between the carrier 131 and the base 101. The rolling member 123 may reduce friction occurring between the carrier 131 and the base 101 when the carrier 131 is moved. The rolling member 123 may have a ball shape, and include a plurality of balls. The plurality of balls may respectively be accommodated in a plurality of guide grooves 1013 disposed at edge regions of the base 101, e.g., disposed at four corners of the base 101. For example, each of the guide grooves 1013 of the base 101 may extend in the second direction to guide the movement of the carrier 131 in the second direction.

A holding magnet 139 may be fixed to a bottom surface of the carrier 131 that faces the base 101. A holding yoke 119 may be fixed to an upper surface of the base 101 that opposes the bottom surface. An attractive force may exist between the holding magnet 139 and the holding yoke 119 to maintain the base 101 and the carrier 131 in close contact with each other. Here, the base 101 and the carrier 131 may be brought into close contact with each other while maintaining a predetermined gap therebetween by the rolling member 123 interposed therebetween.

The image sensor unit 170 may be configured to convert light incident thereto through the lens barrel 110 into an electrical signal. For example, the image sensor unit 170 may include a printed circuit board 175, an image sensor 171 connected to the printed circuit board 175, and an infrared filter. The infrared filter may serve to cut off light in an infrared region in light incident thereto through the lens barrel 110.

The lens driving apparatus 120 may be seated on the base 101. For example, the base 101 may have a quadrilateral shape and a central opening. The image sensor unit 170 may be disposed below the base 101.

The cover 103 may be coupled to the base 101 to cover an outer surface of the base 101, and serve to protect internal components of the camera module 100. In addition, the cover 103 may serve to shield against electromagnetic interference (EMI). For example, the cover 103 may be made of a metal shield can to shield against EMI in the camera module 100 from affecting other electronic components in the electronic device that includes the camera module 100.

Figure 3:
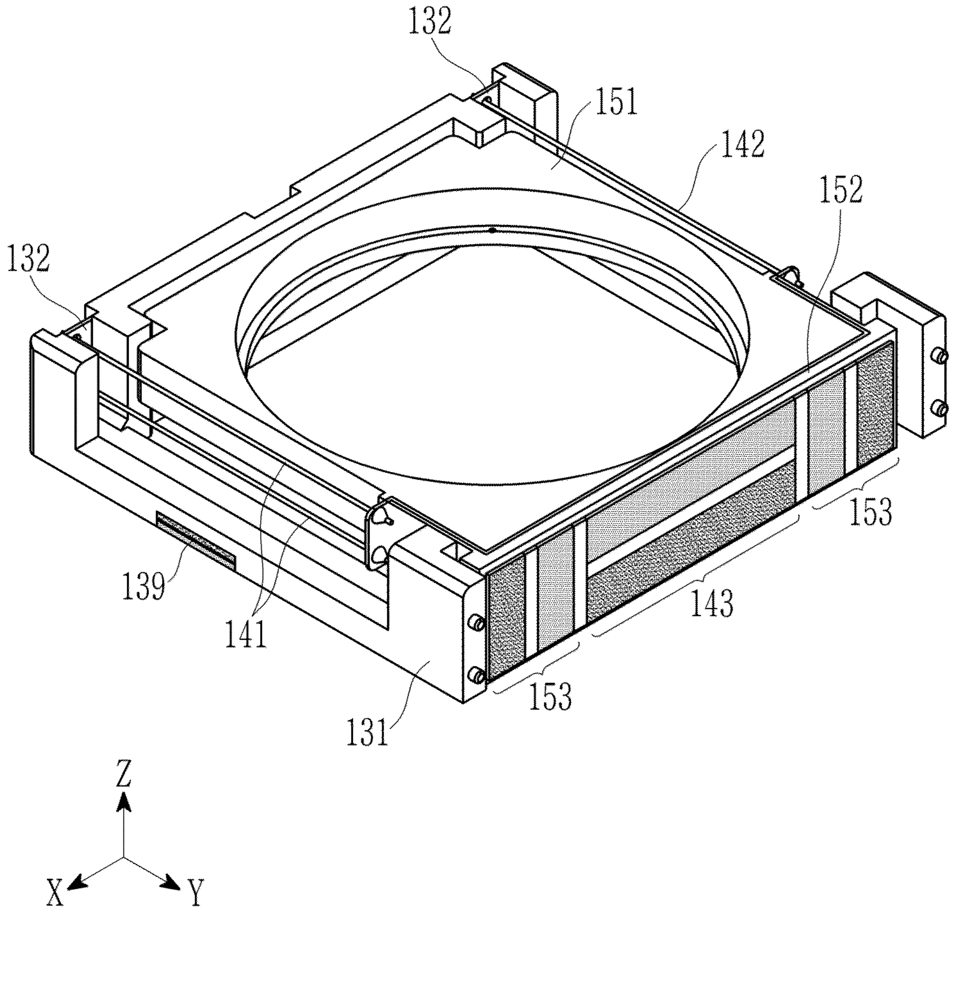
FIG. 3 is a perspective view showing a state where the lens holder and carrier of the camera module shown in FIG. 2 are coupled with each other.
Figure 4:
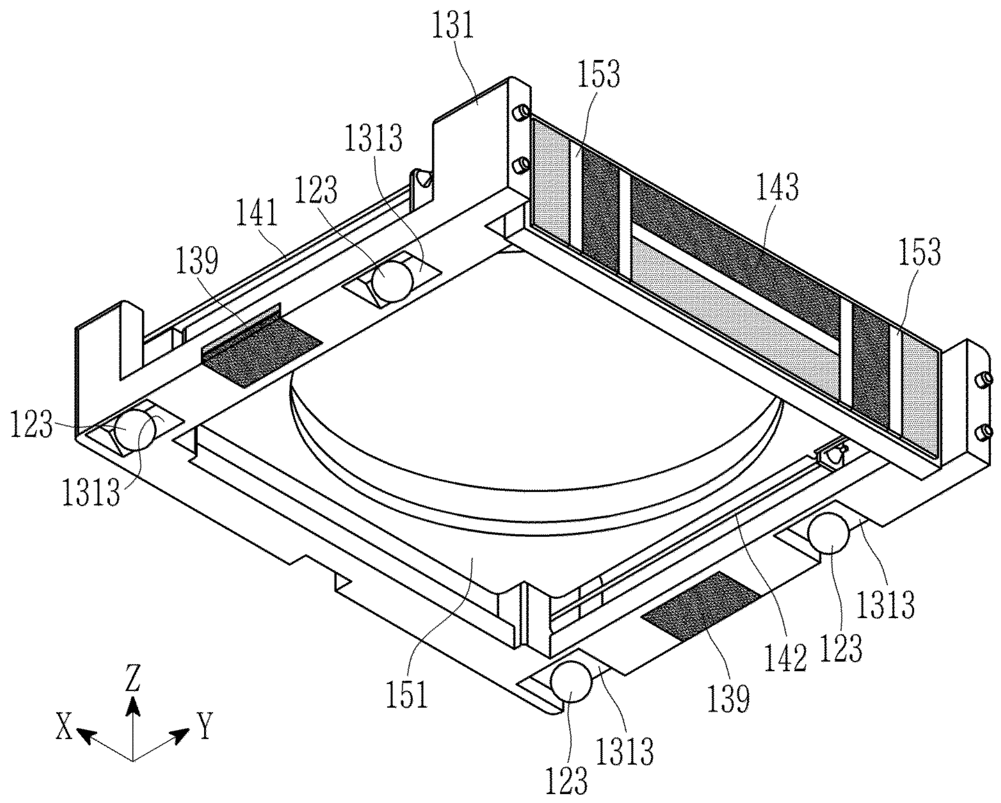
FIG. 4 is a bottom perspective view showing a state where the lens holder and carrier of the camera module shown in FIG. 3 are coupled with each other.

FIG. 3 is a perspective view showing a state where the lens holder and carrier of the camera module shown in FIG. 2 are coupled with each other. FIG. 4 is a bottom perspective view showing a state where the lens holder and carrier of the camera module shown in FIG. 3 are coupled with each other.

Referring to FIG. 3, the AF driving magnet 143 and the first OIS driving magnet 153 may be disposed on an outer surface of the lens holder 151. For example, the AF driving magnet 143 and the first OIS driving magnet 153 may be disposed on the same outer surface of the lens holder 151, adjacent one another. In an example, the AF driving magnet 143 and the first OIS driving magnet 153 may be inserted and fixed into an accommodation groove recessed into an outer surface of the lens holder 151. That is, the AF driving magnet 143 and the first OIS driving magnet 153 may be disposed on the same outer surface of the lens holder 151.

The first OIS driving magnet 153 may include magnets, e.g., a pair of magnets. The AF driving magnet 143 may be disposed at an intermediate location of one of the outer surfaces of the lens holder 151, e.g., in a width direction. The magnets, e.g., the pair of magnets, included in the first OIS driving magnet 153 may be disposed on opposing sides of an outer surface of the lens holder 151 to have the AF driving magnet 143 interposed therebetween.

The pair of magnets included in the first OIS driving magnet 153 may have opposite polarized magnetic poles in the first direction (or the x-axis direction in the drawings). That is, each of the pair of magnets may be disposed to have magnetism opposite to each other in separate regions of the first direction.

The AF driving magnet 143 may have a magnetic pole structure polarized in the optical axis direction, e.g., a z-axis direction in the drawings. That is, the magnets may be disposed to have magnetism opposite to each other in two regions divided in the optical axis direction.

Referring to FIG. 4, the carrier 131 may include a plurality of guide grooves 1313 disposed in the bottom surface thereof. Each of the guide grooves 1313 of the carrier 131 may be disposed to correspond to the guide grooves 1013 of the base 101, and each of the plurality of balls included in the rolling member 123 may be accommodated in the guide grooves 1313 of the carrier 131. Each of the guide grooves 1313 of the carrier 131 may extend in the second direction to guide the movement of the carrier 131 in the second direction.

A semi-solid or solid lubricant, such as grease, may be applied to each of the guide grooves 1013 or 1313 in which the rolling member 123 is accommodated to reduce friction and the impact of disturbance.

Figure 5:
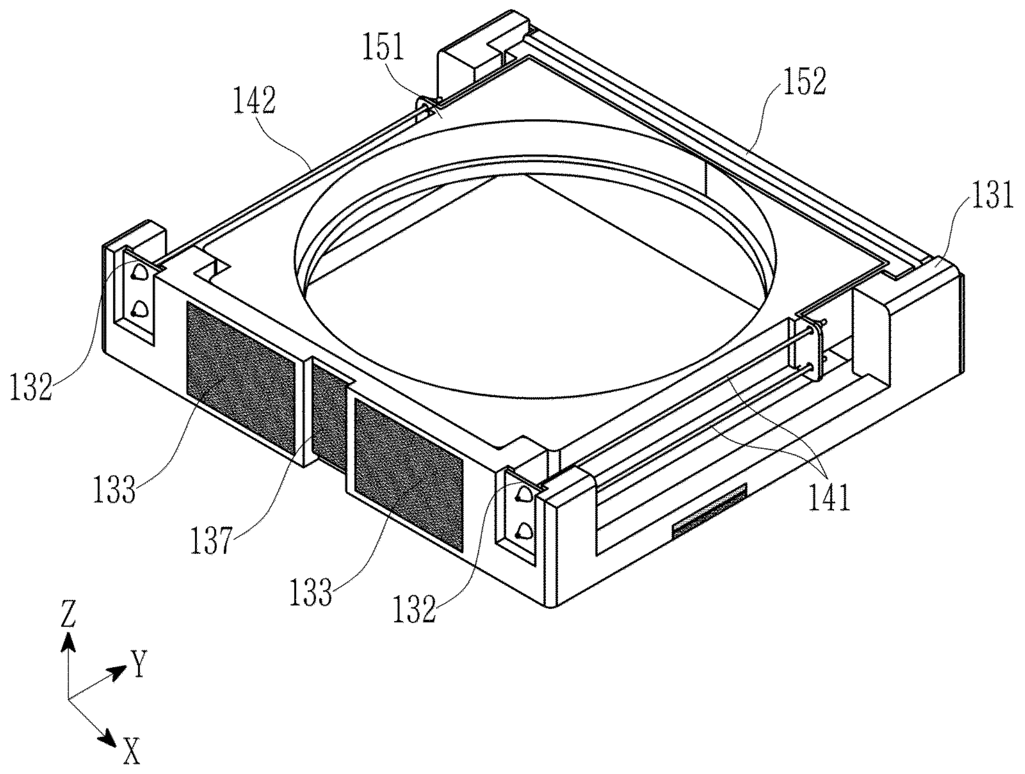
FIG. 5 is a perspective view showing another angle of a state where the lens holder and carrier of the camera module shown in FIG. 2 are coupled with each other.
Figure 6:
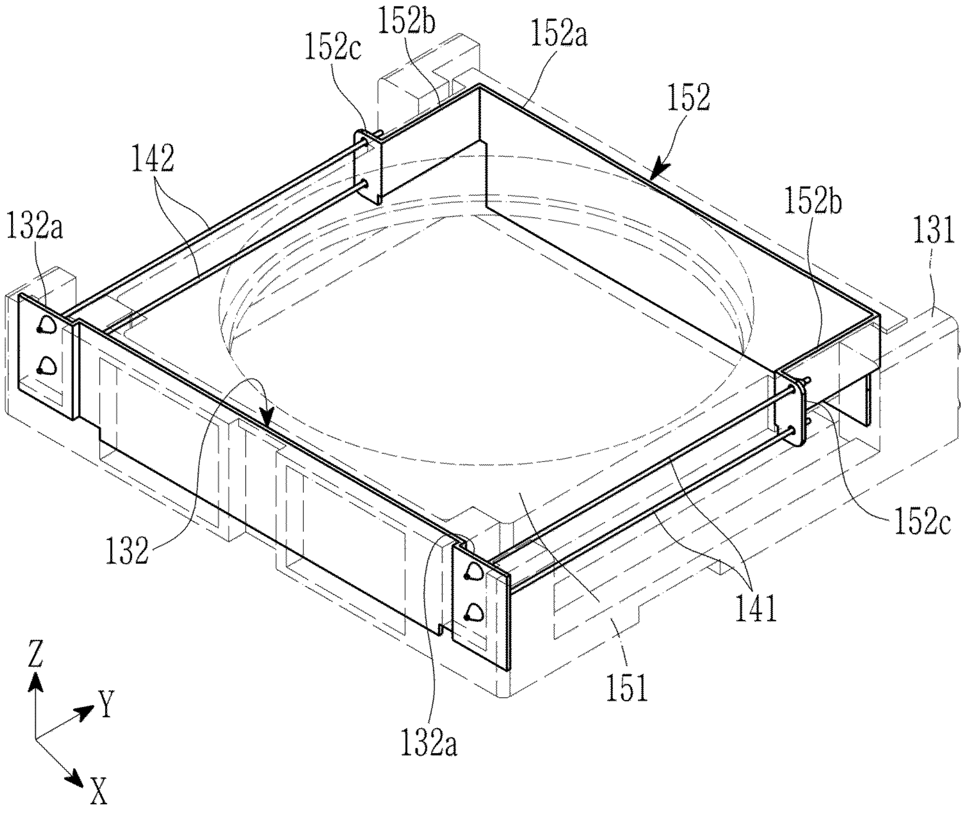
FIG. 6 is a perspective view showing a state where the yoke member and elastic wire of the camera module shown in FIG. 2 are coupled with each other.

FIG. 5 is a perspective view showing another angle of a state where the lens holder and carrier of the camera module shown in FIG. 2 are coupled with each other. FIG. 6 is a perspective view showing a state where the yoke member and elastic wire of the camera module shown in FIG. 2 are coupled with each other.

Referring to FIG. 5, the second OIS driving magnet 133 may be disposed on an outer surface of the carrier 131. The second OIS driving magnet 133 may be inserted into and fixed to a recessed accommodation groove in an outer surface of the carrier 131.

The second OIS driving magnet 133 may include magnets, e.g., a pair of magnets. The pair of magnets included in the second OIS driving magnet 133 may be separately disposed with a gap therebetween at an intermediate portion of an outer surface of the carrier 131 in the width direction. Each of the pair of magnets included in the second OIS driving magnet 133 may be disposed to have the same magnetism in the second direction (or the y-axis direction in the drawings).

A sensing magnet 137 may be disposed at the gap between the pair of magnets of the second OIS driving magnet 133. The sensing magnet 137 may detect the position of the carrier 131 based on driving the second OIS driver 130.

Referring to FIG. 6, the lens holder 151 may include a lens holder yoke 152 disposed to be biased toward one outer surface. In one example, the lens holder yoke 152 is made of a metallic material, and integrally manufactured with the lens holder 151 by insert injection molding, for example. That is, the lens holder yoke 152 made of the metallic material may be inserted into a plastic mold forming an exterior of the lens holder 151 through an insert injection process.

The lens holder yoke 152 may include a main surface part **152*a* having an area approximately corresponding to one outer surface of the lens holder 151, and a pair of side surface parts 152*b* bent at respective ends of the main surface part 152*a*. The main surface 152*a* of the lens holder yoke 152 may face the AF driver 140 and the first OIS driver 150, and extend in the first direction. Each of the side surface parts 152*b* of the lens holder yoke 152 may extend linearly in the second direction, and a protruding piece 152*c* may be bent at its end. The side surface part 152*b* may extend to a length shorter than half of a width of one outer side of the lens holder 151. The protruding piece 152*c* of the lens holder yoke 152 may protrude outward from the outer surface of the lens holder 151 by being bent from the side surface part 152*b*** in the first direction.

The carrier 131 may include a carrier yoke 132 disposed to be biased toward one outer surface thereof. The carrier yoke 132 may be made of a metallic material, and integrally manufactured with the carrier 131 by insert injection molding. That is, the carrier yoke 132 may be inserted into a plastic mold forming an exterior of the carrier 131 through an insert injection process.

The carrier yoke 132 may have an area approximately corresponding to an outer surface of the carrier 131, face the second OIS driver 130, and extend in the first direction. An exposed part 132*a*, exposed from a mold of the carrier 131, may be disposed at each of two ends, opposing each other, of the carrier yoke 132 in the first direction. The exposed part 132*a* of the carrier yoke 132 may face the protruding piece 152*c* of the lens holder yoke 152 in the second direction.

The elastic member 141 or 142 may connect the lens holder yoke 152 and the carrier yoke 132 with each other. The elastic member 141 or 142 may include an elastic wire extending in the second direction. The elastic member 141 or 142 may be disposed between the lens holder yoke 152 and the carrier yoke 132 to connect the lens holder yoke 152 and the carrier yoke 132 with each other. In one example, the elastic member 141 or 142 is an elastic wire connected to a portion of the lens holder yoke 152 outside the lens holder 151, and the other end of the elastic wire is connected to a portion of the carrier yoke 132 inside the carrier 131. The elastic wire may be disposed to be symmetric to each of the two opposite sides of the lens holder 151. The elastic wire disposed on each of the two opposite sides of the lens holder 151 may be a pair of elastic wires disposed outside the lens holder 151 in the optical axis direction.

In one example, one end of the elastic member 141 is connected or fixed to an exposed part 132*a* at one end of the carrier yoke 132 and the other end of the elastic member 141 is connected or fixed to a protruding piece 152*c* at one end the lens holder yoke 152. Another end of the elastic member 142 is connected or fixed to an exposed part 132*a* at another end of the carrier yoke 132 and the other end of the elastic member 142 is connected or fixed to a protruding piece 152*c* at another end of the lens holder yoke 152.

In one example, the lens holder yoke 152 and the carrier yoke 132 may be integrally formed or fixed to the lens holder 151 and the carrier 131, respectively.

Thus, the elastic member 141 or 142 may connect the lens holder 151 and the carrier 131 with each other, and provide the lens holder 151 with the restoring force in the optical axis direction or the restoring force in the first direction. That is, when the lens holder 151 is moved upward or downward in the optical axis direction by the AF driver 140, the elastic member 141 or 142 may provide a restoring force downward or upward in the optical axis direction. In addition, when the lens holder 151 is moved to the left or right in the first direction by the first OIS driver 150, the elastic member 141 or 142 may provide the restoring force to the right or left in the first direction.

In this embodiment, the elastic member 141 or 142, e.g., the elastic wire, is disclosed as a support structure without a separate power supply. However, the elastic wire may transmit power or signals by being connected to a power or powered terminal. In addition, it is possible to reduce the impact of the disturbance by adding a damper to a fixing part of the elastic wire. This disclosed configuration also falls within the scope of the present disclosure.

Figure 7:
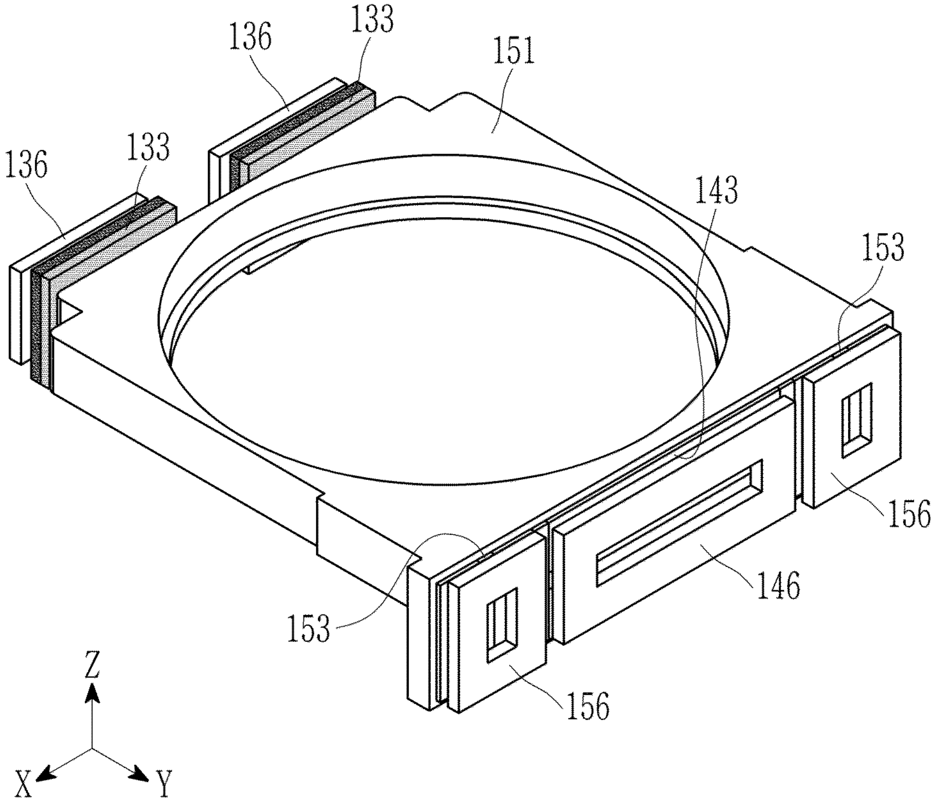
FIG. 7 is a perspective view showing an opposing relationship between a driving magnet disposed in the lens holder of the camera module shown in FIG. 2 and a driving coil corresponding thereto.

FIG. 7 is a perspective view showing an opposing relationship between a driving magnet disposed in the lens holder of the camera module shown in FIG. 2 and a driving coil corresponding thereto.

Referring to FIG. 7, the AF driving magnet 143 may face the AF driving coil 146. The AF driving magnet 143 may have the magnetic pole structure polarized in the optical axis direction (or the z-axis direction in the drawings) when viewed externally of the lens holder 151. Accordingly, when a power signal is applied to the AF driving coil 146, the lens holder 151 mounted with the AF driving magnet 143 may be driven in the optical axis direction.

The first OIS driving magnet 153 may be disposed to face the first OIS driving coil 156. Each of the pair of magnets included in the first OIS driving magnet 153 may have the magnetic pole structure polarized in the first direction (or the x-axis direction in the drawings). Accordingly, when a power signal is applied to the first OIS driving coil 156, the lens holder 151 mounted with the first OIS driving magnet 153 may be driven in the first direction.

The second OIS driving magnet 133 may be disposed to face the second OIS driving coil 136. Each of the pair of magnets included in the second OIS driving magnet 133 may be disposed to have the same magnetism in the second direction (or the y-axis direction in the drawings). Therefore, when a power signal is applied to the second OIS driving coil 136, the carrier 131 mounted with the second OIS driving magnet 133 may be driven in the second direction, and accordingly, the lens holder 151 may also be driven in the second direction.

Figure 8:
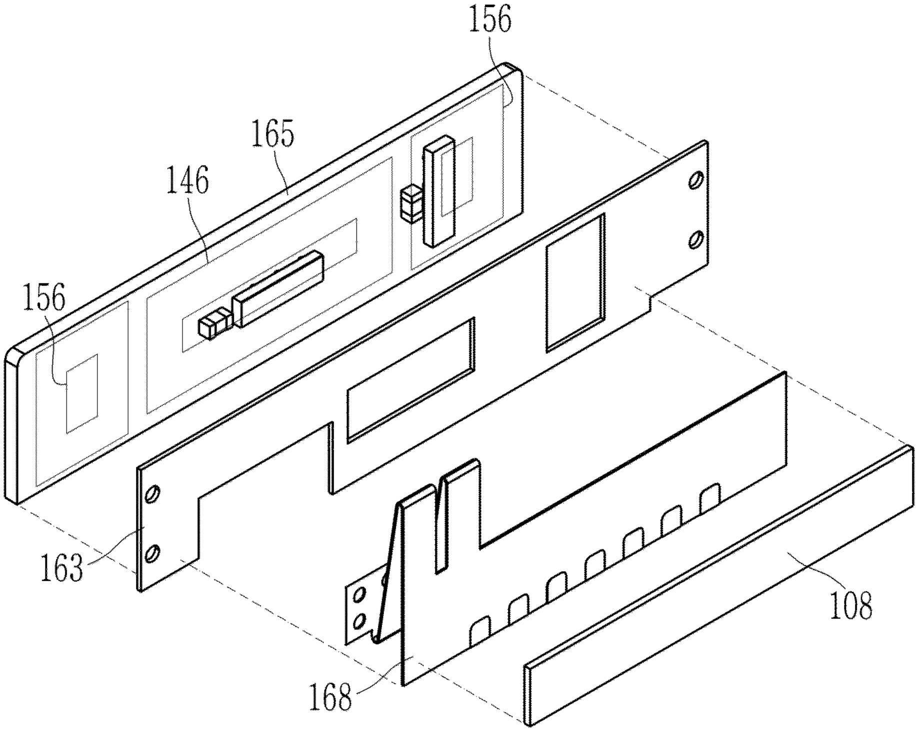
FIG. 8 is a perspective view showing a state where a flexible printed circuit board (FPCB) is connected to the autofocus (AF) driving coil and first OIS driving coil of the camera module shown in FIG. 2 for power and signal connection thereof.

FIG. 8 is a perspective view showing a state where the FPCB is connected to the autofocus (AF) driving coil and first OIS driving coil of the camera module shown in FIG. 2 for power and signal connection thereof.

Referring to FIG. 8, the FPCB 168 may be connected to the AF driving coil 146 and the first OIS driving coil 156 of the camera module 100 for the power connection and signal transmission thereof. The AF driving coil 146 and the first OIS driving coil 156 may be fixed to the carrier 131 via the coil board 165, and the FPCB 168 may be connected to the coil board 165 to be circuit connected thereto.

The coil board 165 may be disposed outside and fixed to the carrier 131 by the support yoke 163 connected to one end of the carrier 131. The support yoke 163 may include an FPCB connector disposed on the coil board 165 and a cut-out region corresponding to electronic elements. The FPCB connector and electronic elements of the coil board 165 may be exposed through the cut-out region. Accordingly, the coil board 165 may be attached and fixed to the support yoke 163, and simultaneously, the FPCB 168 may be connected to the exposed FPCB connector.

The FPCB 168 having one end connected to the coil board 165 may have a flexible part and extend outward. The board holder 108 may be disposed outside the FPCB 168, and fixed to the base 101 to support the FPCB 168. A terminal exposed to the outside of the FPCB 168 may be connected to an external circuit to thus transmit power and signals desired for driving the lens.

Figure 9:
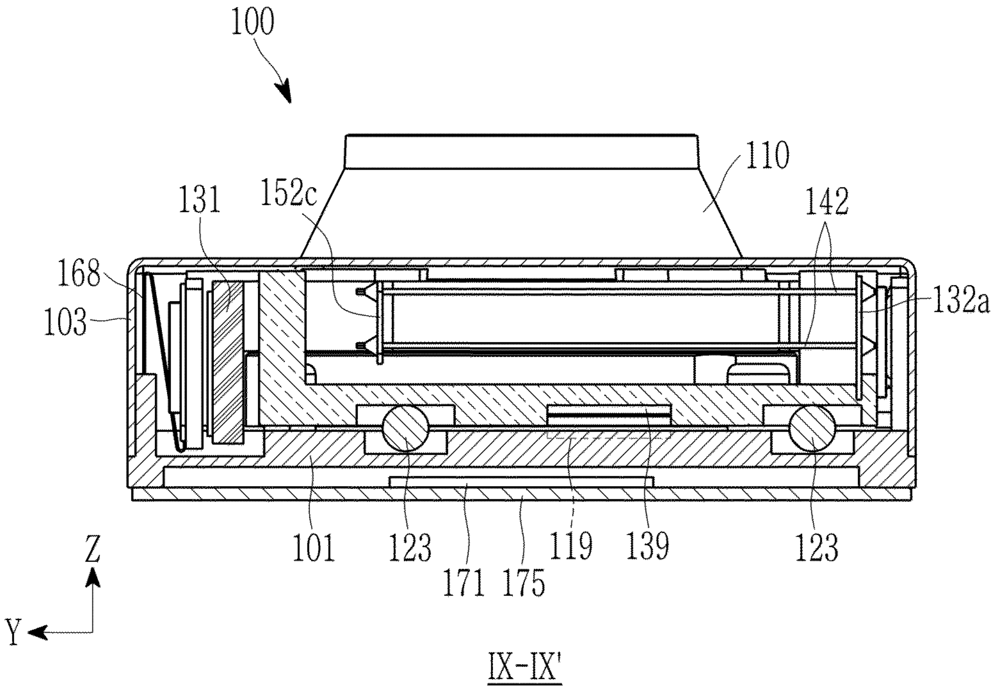
FIG. 9 is a cross-sectional view taken along line IX-IX' of the camera module with the cover shown in FIG. 1 coupled thereto.

FIG. 9 is a cross-sectional view taken along line IX-IX' of the camera module with the cover shown in FIG. 1 coupled thereto.

Referring to FIG. 9, the carrier 131 may be seated on the base 101 via the rolling member 123. The guide grooves 1013 may be disposed in the upper surface of the base 101, and the guide grooves 1313 may be disposed in the bottom surface of the carrier 131. These guide grooves 1013 and 1313 may oppose each other to have a space provided therebetween. The plurality of balls included in the rolling member 123 may be respectively accommodated in the space provided by the guide grooves 1013 and 1313.

In addition, the holding magnet 139 may be disposed on the bottom surface of the carrier 131, and the holding yoke 119 may be disposed on the upper surface of the base 101 corresponding thereto. The holding yoke 119 may be made of a magnetic material, and an attractive force may exist between the holding yoke 119 and the holding magnet 139 when the carrier 131 is seated on the base 101. Therefore, the carrier 131 and the base 101 may be brought into close contact with each other by the holding magnet 139 and the holding yoke 119 while maintaining the gap therebetween set by the rolling member 123 accommodated in the guide grooves 1013 and 1313.

As set forth above, the lens driving apparatus according to the embodiments may reduce the power consumption and prevent the deformation of the components by reducing the weight of the lens driver even though the camera has complex and sophisticated functions. Compared to the conventional lens driving apparatus, the lens driving apparatus according to the embodiments may assist in reducing the material costs by including fewer components.

The camera module according to the embodiments may have the AF driving distance and the OIS driving distance, which are increased by changing the disposition of the AF driver and the OIS driver. In addition, the camera module according to the embodiments may provide a satisfactory level of compensation performance even though the high-frequency disturbance occurs by reducing the camera shake during the video recording using the portable electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A lens driving apparatus comprising:
a lens holder configured to accommodate a lens;
a carrier configured to accommodate the lens holder;
a first optical image stabilization (OIS) driver, disposed outside of the lens holder, configured to drive the lens holder in a first direction perpendicular to an optical axis by virtue of a wire that extends between the lens holder and the carrier; and
a second OIS driver, disposed outside of the carrier to oppose the first OIS driver and having the lens holder interposed therebetween, configured to drive the carrier in a second direction perpendicular to the optical axis and the first direction by virtue of one or more rolling members disposed between the carrier and a base.

2. The apparatus of claim 1, further comprising
an autofocus (AF) driver, disposed outside of the lens holder, configured to drive the lens holder in an optical axis direction.

3. The apparatus of claim 2, wherein
the AF driver and the first OIS driver are disposed on a same outer surface of the lens holder.

4. The apparatus of claim 2, wherein
the AF driver includes an AF driving magnet disposed on a first outer surface of the lens holder to face an AF driving coil with a gap therebetween,
the first OIS driver includes a first OIS driving magnet disposed on a second outer surface of the lens holder to face a first OIS driving coil with a gap therebetween, and
the second OIS driver includes a second OIS driving magnet disposed on a third outer surface of the carrier to face a second OIS driving coil with a gap therebetween.

5. The apparatus of claim 4, wherein
the first outer surface of the lens holder and the second outer surface of the lens holder are the same.

6. The apparatus of claim 4, wherein
the first OIS driving magnet includes a pair of magnets, disposed on opposing sides of the second outer surface of the lens holder and having the AF driving magnet interposed therebetween.

7. The apparatus of claim 4, wherein
the first OIS driving magnet includes regions divided in the first direction with different magnetic poles.

8. The apparatus of claim 1,
wherein the wire is an elastic member, connecting the lens holder and the carrier with each other, and configured to provide the lens holder with a restoring force in an optical axis direction or the first direction.

9. The apparatus of claim 8, wherein
the elastic member extends along the second direction to connect the lens holder with the carrier.

10. The apparatus of claim 1,
wherein the carrier is seated on the base, and
wherein the at least one rolling member is interposed between the carrier and the base.

11. The apparatus of claim 10, further comprising
a holding magnet and a holding yoke disposed on the carrier and the base, respectively, to generate an attractive force between the carrier and the base.

12. The apparatus of claim 1, wherein the apparatus is a camera module.

13. A lens driving apparatus comprising:
a lens holder configured to accommodate a lens;
a carrier configured to accommodate the lens holder;
a first optical image stabilization (OIS) driver, disposed outside of the lens holder, configured to drive the lens holder in a first direction perpendicular to an optical axis;
a second OIS driver, disposed outside of the carrier to oppose the first OIS driver and having the lens holder interposed therebetween, configured to drive the carrier in a second direction perpendicular to the optical axis and the first direction; and
an autofocus (AF) driver, disposed outside of the lens holder, configured to drive the lens holder in an optical axis direction,
wherein the AF driver and the first OIS driver are disposed on a same outer surface of the lens holder.

* * * * *